US006966776B1

(12) United States Patent  (10) Patent No.: US 6,966,776 B1
Jones  (45) Date of Patent: Nov. 22, 2005

(54) EDUCATIONAL DOLL

(76) Inventor: Rhonda L. Jones, 49 Millfield, High Ongar, Essex (GB) CM5 9RJ ( * ) Notice: Subject to any disclaimer, the term of this patent is extended or adjusted under 35 U.S.C. 154(b) by 60 days.

(21) Appl. No.: 10/914,997

(22) Filed: Aug. 11, 2004

(51) Int. Cl.[7] .......................... G09B 21/00; A63H 3/04
(52) U.S. Cl. ...................... 434/112; 446/100; 446/372; 446/374; 446/337; 446/392
(58) Field of Search ............................... 446/372, 374, 446/392, 337; 434/112

(56) References Cited

U.S. PATENT DOCUMENTS

| | | | | |
|---|---|---|---|---|
| 2,109,422 A | * | 2/1938 | Haughton | 446/374 |
| 3,014,994 A | * | 12/1961 | Posen | 381/327 |
| 3,825,700 A | * | 7/1974 | Jerry et al. | 381/327 |
| 4,186,517 A | | 2/1980 | Kuhn et al. | |
| 4,196,541 A | * | 4/1980 | Clokey | 446/374 |
| 4,710,145 A | * | 12/1987 | Hall Vandis | 446/100 |
| 4,799,889 A | | 1/1989 | Yockey | |
| 5,159,639 A | * | 10/1992 | Shannon et al. | 381/327 |
| 5,215,493 A | | 6/1993 | Zgrodek et al. | |
| 5,630,745 A | * | 5/1997 | Yeh | 446/374 |
| 5,800,242 A | * | 9/1998 | Clokey | 446/374 |
| 5,862,615 A | * | 1/1999 | O'Rourke | 40/1.6 |
| 5,902,169 A | | 5/1999 | Yamakawa | |
| 5,953,692 A | | 9/1999 | Siegel | |
| D496,078 S | * | 9/2004 | DesRosier | D21/635 |

\* cited by examiner

*Primary Examiner*—Jessica Harrison
*Assistant Examiner*—Dmitry Suhol (57) ABSTRACT

A toy for teaching sign language includes a body with a thoracic portion and a lower limb portion that are movable between rotated and stationary positions. The present invention further includes metacarpals provided with a wire frame passing therethrough, which makes them flexible for defining various sign language movements. The present invention further includes a facial section with an oral section that is adaptable to provide various expressions via a wire frame. The facial section further includes eyebrow sections that are adaptable to a corresponding position as the oral section changes shape. The present invention may further include a simulated hearing aid and fastener for removably affixing the hearing aid to the facial section.

12 Claims, 7 Drawing Sheets

EDUCATIONAL DOLL

CROSS REFERENCE TO RELATED APPLICATIONS

Not Applicable.

STATEMENT REGARDING FEDERALLY SPONSORED RESEARCH OR DEVELOPMENT

Not Applicable.

REFERENCE TO A MICROFICHE APPENDIX

Not Applicable.

BACKGROUND OF THE INVENTION

1. Technical Field

This invention relates to an educational doll and, more particularly, to a play doll that may be used to educate deaf as well as hearing impaired persons.

2. Prior Art

There are a variety of stuffed dolls and toys on the market today which have many shapes and characteristics. Most stuffed dolls and toys do not have movable parts or changeable features. They are primarily soft and cuddly toys meant to be played with and loved by their owners. Some have an added characteristic, for example, movable parts or the ability to talk.

It has been found that people attempting to learn sign language and especially the deaf, emotionally, or learning-impaired and physically handicapped, learn better from a teacher or communicator when the teacher is camouflaged or hidden behind a teaching aid which allows for the teacher to carry on his or her lesson or objective while, at the same time presenting to the viewer a facade that is pleasing and unobtrusive to the viewer.

It is, of course, well-known to teach children, to a certain and limited extent, via puppets, dolls, and the like, which allows one to engage the interest and fancy of the child while concomitantly instructing the child. Any barrier, whether natural or artificial, is at least partially broken down by such "transference" to the inanimate, yet "attention-directing", prop or aid. The opportunity for learning through the imaginative play with puppets has been nearly inaccessible to the Deaf. Puppets that "talk" can only be interpreted to the Deaf.

Numerous toys have been proposed in the past, which have the ability to provide a changing facial expression, a movable mouth, and movable eyes in order to simulate mood changes. Such toys however lack the characteristics needed to educate the hearing impaired.

Accordingly, a need remains for an educational doll with movable parts and changing facial expressions that may be used to teach the hearing impaired while overcoming the above-noted shortcomings.

BRIEF SUMMARY OF THE INVENTION

In view of the foregoing background, it is therefore an object of the present invention to provide an educational doll. These and other objects, features, and advantages of the invention are provided by a toy for teaching sign language that includes a body having a centrally disposed longitudinal axis extending along a length thereof. Such a body includes a thoracic portion and a lower limb portion disposed along the axis and connected thereto. The thoracic and lower limb portions are independently movable between rotated and stationary positions.

The present invention further includes a plurality of upper limb sections connected to the body and extending outwardly therefrom in opposed directions. Such upper limb sections further include a plurality of metacarpals and a wire frame including a plurality of wire members independently passing through the plurality of metacarpals so that the upper limb section can be adapted into alternate shapes as desired by a user. Advantageously, the plurality of upper limb sections are flexible and adaptable for defining various sign language movements.

The present invention further includes a facial section connected to the body that is selectively pivotal about the axis so that the body can remain stationary during movement of the facial section. Such a facial section includes an oral section having upper and lower portions that are adaptable for defining various expressions. Advantageously, the oral section further includes a wire frame having a plurality of wire members extending laterally across the oral section and substantially perpendicular to the axis. Select ones of the plurality of wire members are disposed along the upper and lower portions of the oral section respectively so that the upper and lower portions can be independently adapted during operating conditions. The oral section is preferably formed from elastomeric material, well- known by those skilled in the art.

The facial section further includes a plurality of eyebrow sections disposed above the oral section and cooperating therewith, wherein the plurality of eyebrow sections are contemporaneously adaptable to a corresponding position as the oral section changes shape. Such a plurality of eyebrows sections advantageously include a plurality of couplings pivotally connected to the facial section and extending outwardly therefrom so that the plurality of eyebrows can preferably be spaced forwardly of the facial section. The plurality of eyebrows further include a wire frame extending substantially orthogonal to the plurality of couplings and are movable along a first path as the plurality of couplings are moved along a second path.

The present invention may further include a simulated hearing aid and associated fastener for removably affixing the hear aid to a select portion of the facial section. Such a fastener may include a hook and loop fastener, such as VELCRO, well known to a person of ordinary skill in the art.

BRIEF DESCRIPTION OF THE SEVERAL VIEWS OF THE DRAWING

The novel features believed to be characteristic of this invention are set forth with particularity in the appended claims. The invention itself, however, both as to its organization and method of operation, together with further objects and advantages thereof, may best be understood by reference to the following description taken in connection with the accompanying drawings in which:

DETAILED DESCRIPTION OF THE INVENTION

The present invention will now be described more fully hereinafter with reference to the accompanying drawings, in which a preferred embodiment of the invention is shown. This invention may, however, be embodied in many different forms and should not be construed as limited to the embodiment set forth herein. Rather, this embodiment is provided so that this application will be thorough and complete, and will fully convey the true scope of the invention to those skilled in the art. Like numbers refer to like elements throughout the figures.

The apparatus of this invention is referred to generally in FIGS. 1–10 by the reference numeral 10 and is intended to provide a toy that may be used to educate the hearing impaired. It should be understood that the apparatus 10 may be used as a play toy and as well as an educational tool in a variety of ways.

Figure 1:
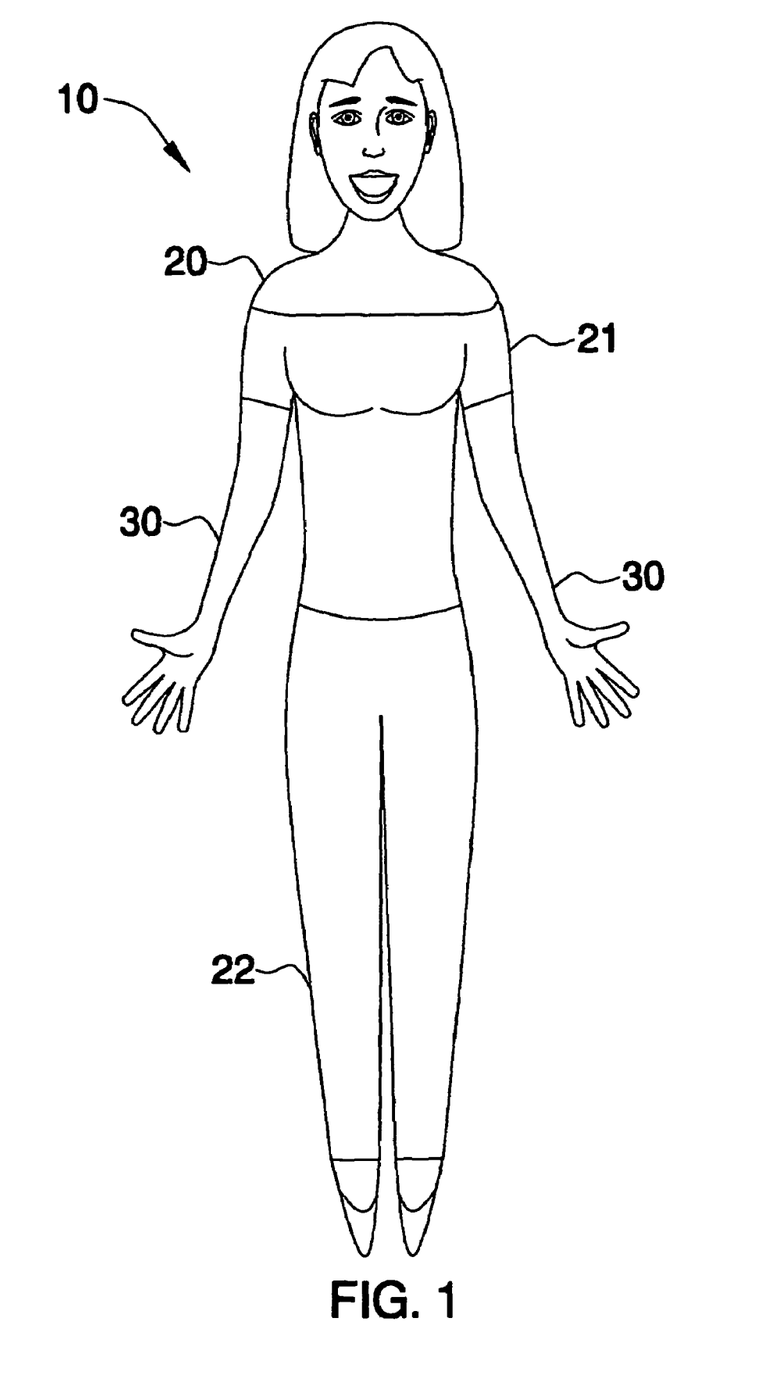
FIG. 1 is a front elevational view showing a movable doll for teaching deaf and hearing impaired persons, in accordance with the present invention.
Figure 2:
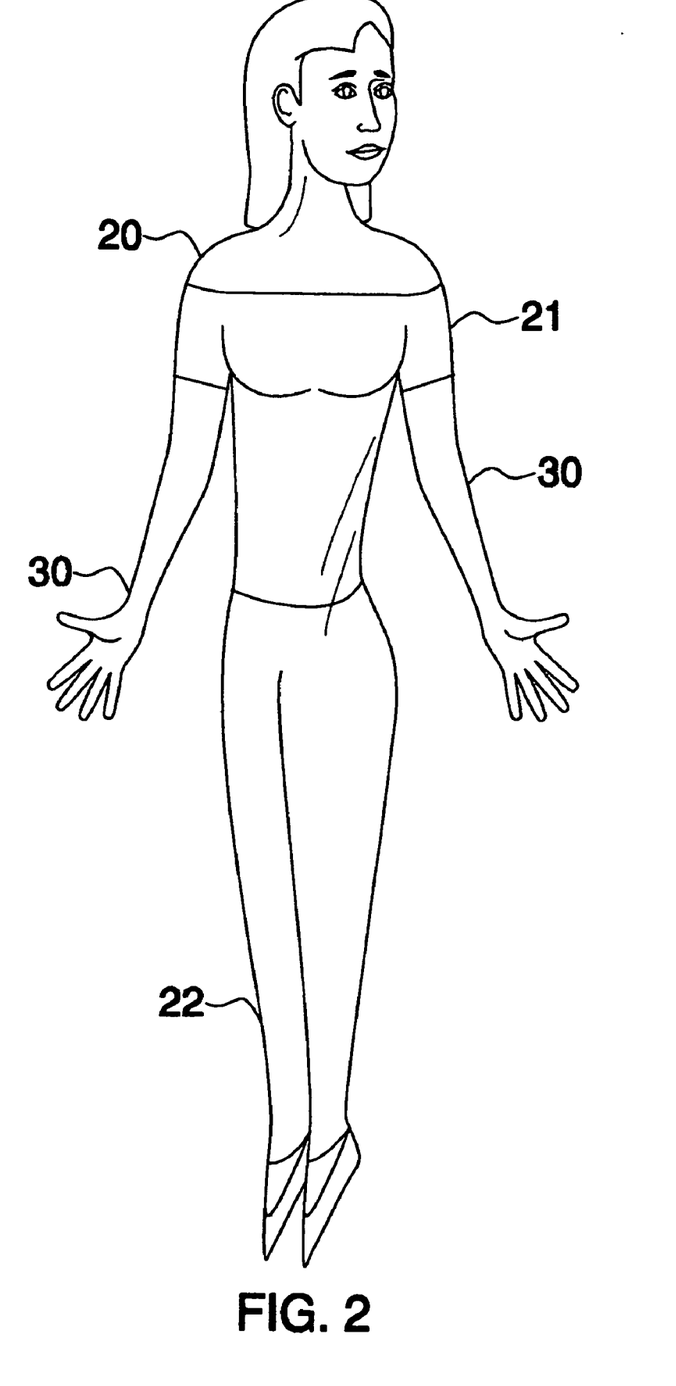
FIG. 2 is a front elevational view showing the present invention at a rotated position.

Referring initially to FIGS. 1 and 2, the apparatus 10 includes a body 20 having a centrally disposed longitudinal axis extending along a length thereof. Such a body 20 includes a thoracic portion 21 and a lower limb portion 22 disposed along the axis and connected thereto. The thoracic 21 and lower limb 22 portions are independently movable between rotated and stationary positions.

Figure 9:
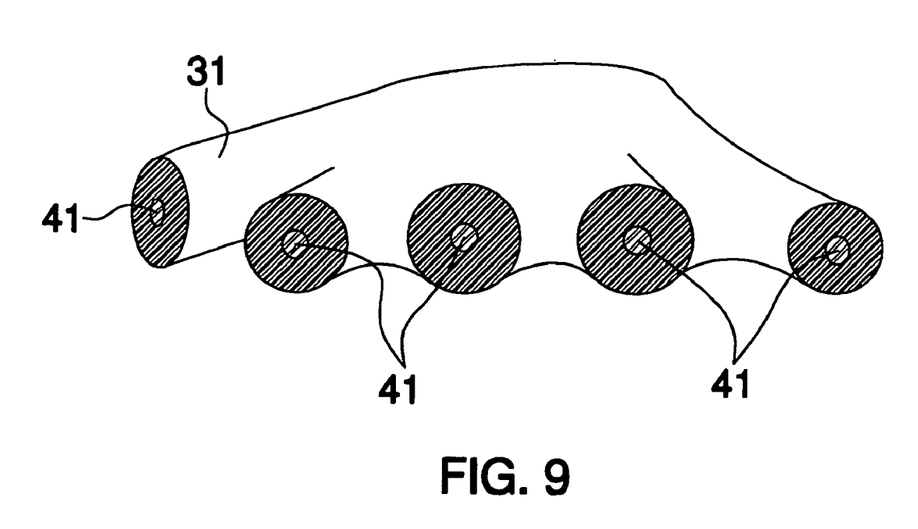
FIG. 9 is an enlarged cross-sectional view showing an upper limb portion and associated wire frame.

Referring to FIG. 9, the present invention further includes a plurality of upper limb sections 30 connected to the body 20 and extending outwardly therefrom in opposed directions. Such upper limb sections 30 further include a plurality of metacarpals 31 and a wire frame including a plurality of wire members 41 independently passing through the plurality of metacarpals 31 so that the upper limb section 30 can be adapted into alternate shapes as desired by a user. Advantageously, the plurality of upper limb sections 30 are flexible and adaptable for defining various sign language movements.

Figure 3:
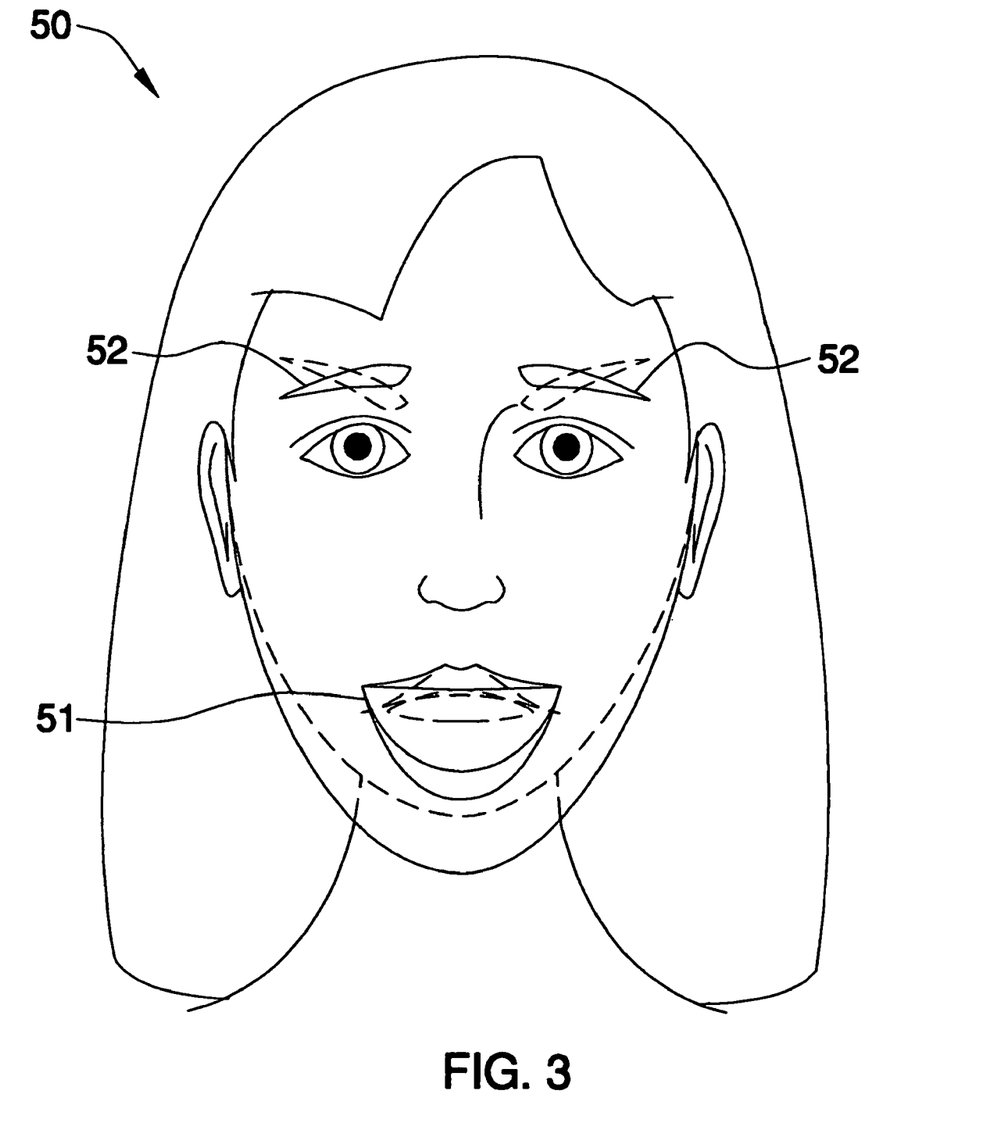
FIG. 3 is an enlarged front elevational view showing the movable facial portions of the present invention.
Figure 4:
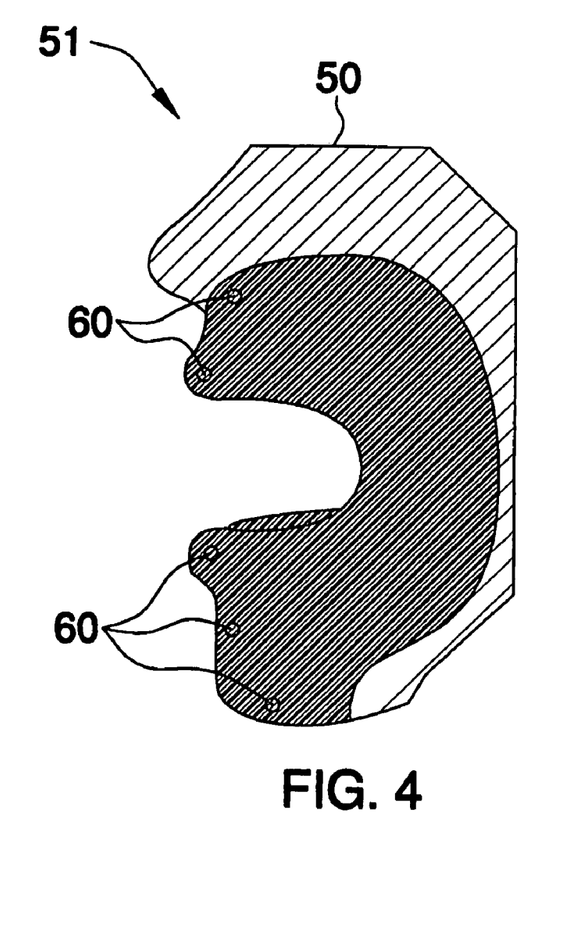
FIG. 4 is an enlarged cross-sectional view showing the lip portions and associated wire frame.

Referring to FIG. 3, the present invention further includes a facial section 50 connected to the body 20 that is selectively pivotal about the axis so that the body 20 can remain stationary during movement of the facial section 50. Such a facial section 50 includes an oral section 51 having upper and lower portions that are adaptable for defining various expressions. Advantageously, the oral section 51 further includes a wire frame having a plurality of wire members 60 extending laterally across the oral section 51 and substantially perpendicular to the axis, as best shown in FIG. 4.

Select ones of the plurality of wire members 60 are disposed along the upper and lower portions of the oral section 51 respectively so that the upper and lower portions can be independently adapted during operating conditions. The oral section 51 is preferably formed from elastomeric material, well-known by those killed in the art.

Figure 6:
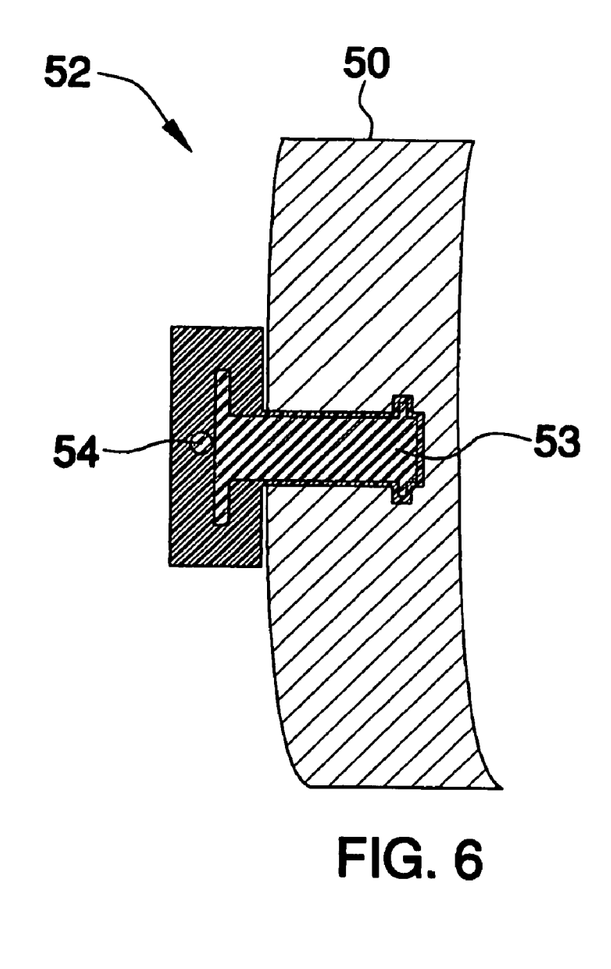
FIG. 6 is an enlarged cross-sectional view of an eyebrow coupling mechanism shown in FIG. 1.
Figure 7:
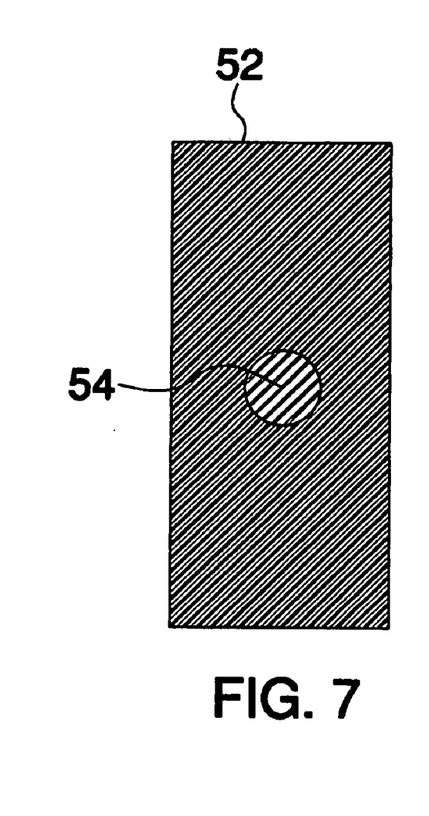
FIG. 7 is an enlarged cross-sectional view of an eyebrow member shown in FIG. 6.
Figure 8:
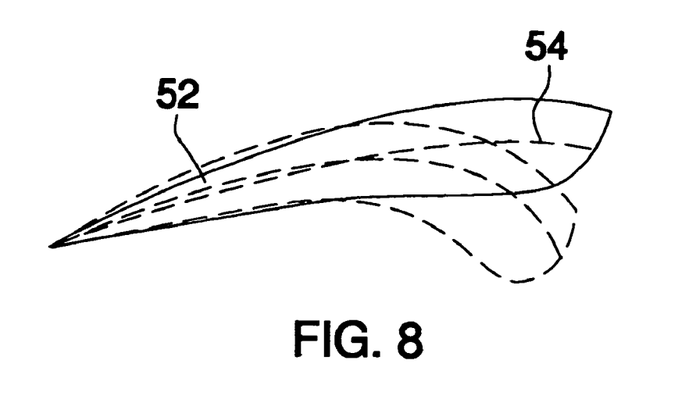
FIG. 8 is an enlarged front elevational view of the eyebrow member shown in FIG. 1.

Referring to FIGS. 6, 7, and 8, the facial section 50 further includes a plurality of eyebrow sections 52 disposed above the oral section 51 and cooperating therewith, wherein the plurality of eyebrow sections 52 are contemporaneously adaptable to a corresponding position as the oral section 51 changes shape. Such a plurality of eyebrows sections 52 advantageously include a plurality of couplings 53 pivotally connected to the facial section 50 and extending outwardly therefrom so that the plurality of eyebrows 52 can preferably be spaced forwardly of the facial section 50. The plurality of eyebrows 52 further include a wire frame 54 extending substantially orthogonal to the plurality of couplings 53 and are movable along a first path as the plurality of couplings 53 are moved along a second path.

Figure 5:
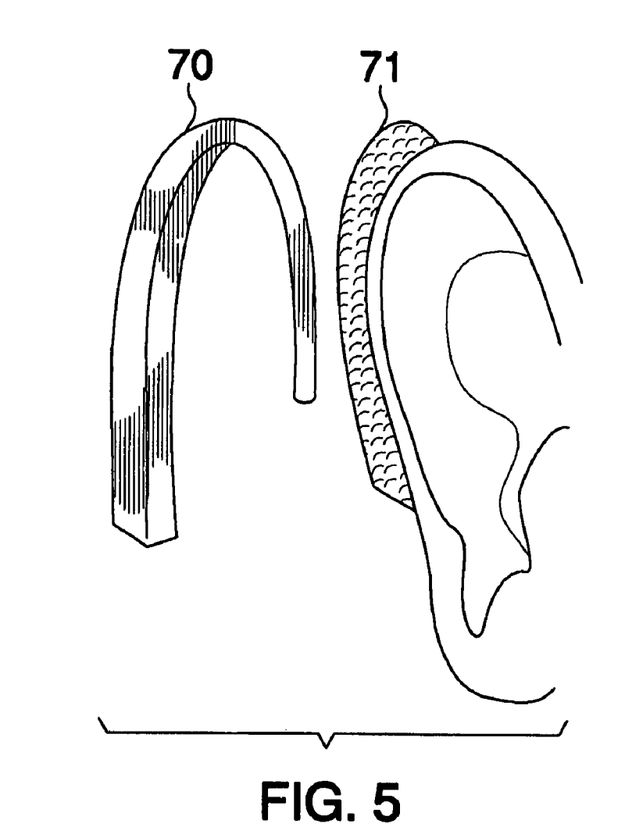
FIG. 5 is an enlarged perspective view of the simulated hearing aid and hook and loop fastener strap.

Referring to FIG. 5, the present invention may further include a simulated hearing aid 70 and associated fastener 71 for removably affixing the hear aid 70 to a select portion of the facial section 50. Such a fastener 71 may include a hook and loop fastener, such as VELCRO, well known to a person of ordinary skill in the art.

Figure 10:
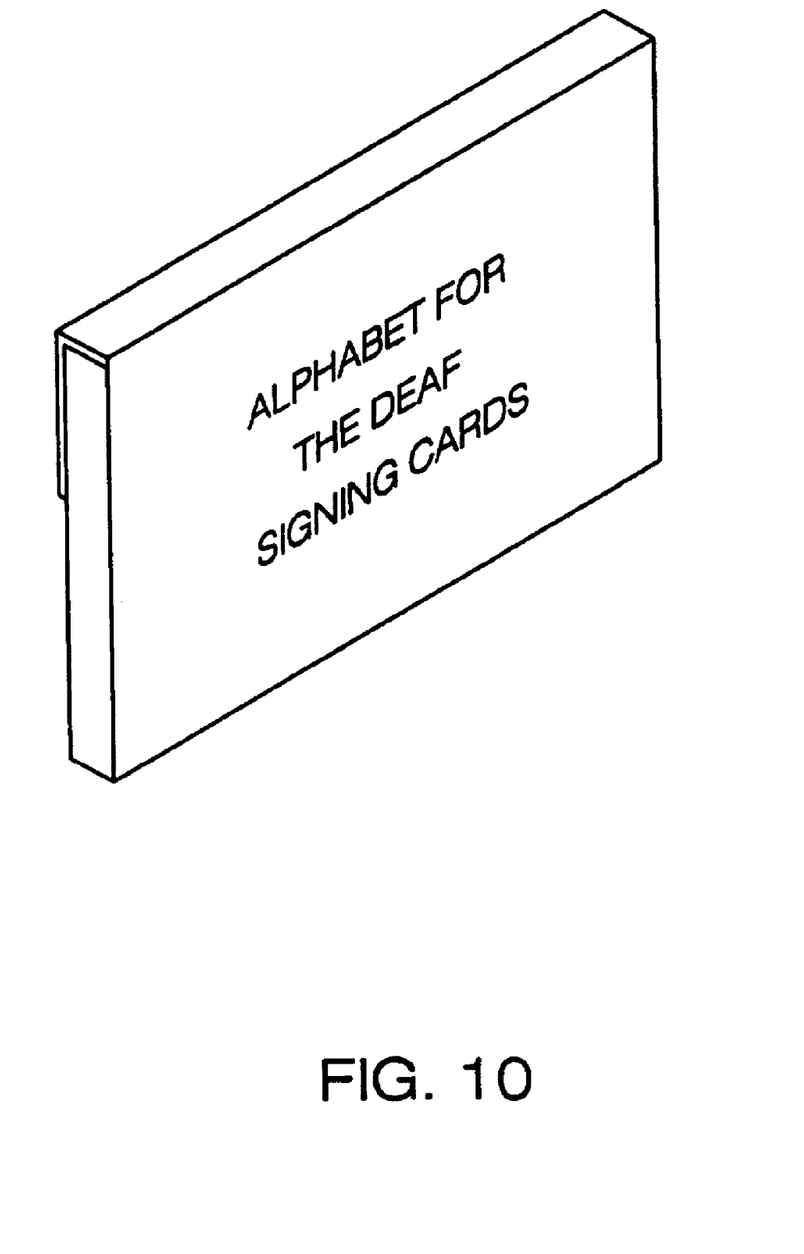
FIG. 10 is a perspective view showing a case for carrying a plurality of alphabet cards for the deaf.

FIG. 10 displays a carrying case for storing cards that illustrate the sign language alphabet.

The wire framing within the present invention gives it flexibility that enables the doll to show emotions such as excitement, dismay, confusion, fear, and exhaustion in conjunction with sign language. This feature greatly appeals to deaf children who are learning how to communicate their feelings. In addition to educational accessories, the doll may also feature clothing and jewelry making it an enjoyable toy.

While the invention has been described with respect to a certain specific embodiment, it will be appreciated that many modifications and changes may be made by those skilled in the art without departing from the spirit of the invention. It is intended, therefore, by the appended claims to cover all such modifications and changes as fall within the true spirit and scope of the invention.

In particular, with respect to the above description, it is to be realized that the optimum dimensional relationships for the parts of the present invention may include variations in size, materials, shape, form, function and manner of operation. The assembly and use of the present invention are deemed readily apparent and obvious to one skilled in the art.

What is claimed is:

1. A toy for teaching sign language, said toy comprising:
   a body having a centrally disposed longitudinal axis extending along a length thereof, said body including a thoracic portion and a lower limb portion disposed along the axis and connected thereto, said thoracic and lower limb portion being independently movable between rotated and stationary positions;
   a plurality of upper limb sections connected to said body and extending outwardly therefrom in opposed directions, said plurality of upper limb sections being flexible and adaptable for defining various sign language movements; and
   a facial section connected to said body and being selectively pivotal about the axis so that said body can remain stationary during movement of said facial section, said facial section comprising
      an oral section including upper and lower portions and being adaptable for defining various expressions, and
      a plurality of eyebrow sections disposed above said oral section and cooperating therewith, wherein said plurality of eyebrow sections are contemporaneously adaptable to a corresponding position as said oral section changes shape;

wherein said plurality of eyebrows comprise
a plurality of couplings pivotally connected to said facial section and extending outwardly therefrom so that said plurality of eyebrows can be spaced forwardly of said facial section; and
a wire frame extending substantially orthogonal to said plurality of couplings and being movable along a first path as said plurality of couplings are moved along a second path.

2. The toy of claim 1, wherein said oral section comprises:
a wire frame including a plurality of wire members extending laterally across said oral section and substantially perpendicular to the axis, select ones of said plurality of wire members being disposed along said upper and lower portions of said oral section respectively so that said upper and lower portions can be independently adapted during operating conditions.

3. The toy of claim 1, wherein said oral section is formed from elastomeric material.

4. The toy of claim 3, further comprising: a simulated hearing aid and means for removably affixing said hearing aid to a select portion of said facial section, said affixing means comprising a hook and loop fastener.

5. The toy of claim 1, wherein said upper limb section comprises: a plurality of metacarpals; and
a wire frame including a plurality wire members independently passing through said plurality of metacarpals so that said upper limb section can be adapted into alternate shapes as desired by a user.

6. A toy for teaching sign language, said toy comprising:
a body having a centrally disposed longitudinal axis extending along a length thereof, said body including a thoracic portion and a lower limb portion disposed along the axis and connected thereto, said thoracic and lower limb portion being independently movable between rotated and stationary positions;
a plurality of upper limb sections connected to said body and extending outwardly therefrom in opposed directions, said plurality of upper limb sections being flexible and adaptable for defining various sign language movements; and
a facial section connected to said body and being selectively pivotal about the axis so that said body can remain stationary during movement of said facial section, said facial section comprising
an oral section including upper and lower portions and being adaptable for defining various expressions, said oral section comprising
a wire frame including a plurality of wire members extending laterally across said oral section and substantially perpendicular to the axis, select ones of said plurality of wire members being disposed along said upper and lower portions of said oral section respectively so that said upper and lower portions can be independently adapted during operating conditions, and
a plurality of eyebrow sections disposed above said oral section and cooperating therewith, wherein said plurality of eyebrow sections are contemporaneously adaptable to a corresponding position as said oral section changes shape;
wherein said plurality of eyebrow sections comprise
a plurality of couplings pivotally connected to said facial section and extending outwardly therefrom so that said plurality of eyebrows can be spaced forwardly of said facial section; and
a wire frame extending substantially orthogonal to said plurality of couplings and being movable along a first path as said plurality of couplings are moved along a second path.

7. The toy of claim 6, wherein said oral section is formed from elastomeric material.

8. The toy of claim 6, further comprising: a simulated hearing aid and means for removably affixing said hearing aid to a select portion of said facial section, said affixing means comprising a hook and loop fastener.

9. The toy of claim 6, wherein said upper limb sections comprise: a plurality of metacarpals; and
a wire frame including a plurality wire members independently passing through said plurality of metacarpals so that said upper limb section can be adapted into alternate shapes as desired by a user.

10. A toy for teaching sign language, said toy comprising:
a body having a centrally disposed longitudinal axis extending along a length thereof, said body including a thoracic portion and a lower limb portion disposed along the axis and connected thereto, said thoracic and lower limb portion being independently movable between rotated and stationary positions;
a plurality of upper limb sections connected to said body and extending outwardly therefrom in opposed directions, said plurality of upper limb sections being flexible and adaptable for defining various sign language movements
a facial section connected to said body and being selectively pivotal about the axis so that said body can remain stationary during movement of said facial section, said facial section comprising
an oral section including upper and lower portions and being adaptable for defining various expressions, said oral section comprising
a wire frame including a plurality of wire members extending laterally across said oral section and substantially perpendicular to the axis, select ones of said plurality of wire members being disposed along said upper and lower portions of said oral section respectively so that said upper and lower portions can be independently adapted during operating conditions, and
a plurality of eyebrow sections disposed above said oral section and cooperating therewith, wherein said plurality of eyebrow sections are contemporaneously adaptable to a corresponding position as said oral wherein said plurality of eyebrows comprise
a plurality of couplings pivotally connected to said facial section and extending outwardly therefrom so that said plurality of eyebrows can be spaced forwardly of said facial section; and
a wire frame extending substantially orthogonal to said plurality of couplings and being movable along a first path as said plurality of couplings are moved along a second path; and
a simulated hearing aid and means for removably affixing said hearing aid to a select portion of said facial section, said affixing means comprising a hook and loop fastener.

11. The toy of claim 10, wherein said oral section is formed from elastomeric material.

12. The toy of claim 10, wherein said upper limb section comprises: a plurality of metacarpals; and
a wire frame including a plurality wire members independently passing through said plurality of metacarpals so that said upper limb section can be adapted into alternate shapes as desired by a user.

* * * * *